(12) United States Patent
Chen

(10) Patent No.: US 6,532,253 B1
(45) Date of Patent: Mar. 11, 2003

(54) SPREAD SPECTRUM SYSTEMS WITH TRELLIS-CODED MODULATION

(75) Inventor: Changlin Chen, Fairfax, VA (US)

(73) Assignee: IoWave, Inc., Arlington, VA (US)

( * ) Notice: Subject to any disclaimer, the term of this patent is extended or adjusted under 35 U.S.C. 154(b) by 0 days.

(21) Appl. No.: 09/311,059

(22) Filed: May 14, 1999

Related U.S. Application Data

(60) Provisional application No. 60/085,575, filed on May 15, 1998.

(51) Int. Cl.[7] ............................. H04B 1/707; H04L 5/12
(52) U.S. Cl. ......................................... 375/146; 375/265
(58) Field of Search ................................. 375/130–153, 375/265

(56) References Cited

U.S. PATENT DOCUMENTS 5,933,781 A * 8/1999 Willenegger et al. ....... 370/342
6,009,117 A * 12/1999 Yamamura ................... 375/141

* cited by examiner

Primary Examiner—Stephen Chin
Assistant Examiner—Kevin Kim
(74) Attorney, Agent, or Firm—Morgan & Finnegan, LLP

(57) ABSTRACT

In a spread spectrum system, the transmitter encodes and modulates a data stream by use of trellis-coded modulation. Trellis-coded modulation uses a convolutional coding scheme or a block code scheme along with a bandwidth-efficient signal constellation, such as QAM (quadrature amplitude modulation) or MPSK (M-ary phase-shift keying). Mapping of the data stream to the constellation signals can be implemented in a look-up table. At the receiver, the received data is despread and passed to a decoder for recovery of the original data stream. The decoder can be a Viterbi decoder if convolutional coding is used or a different decoding mechanism if block coding is adopted. This system achieves high coding gain without a decrease in processing gain, as well as providing increased flexibility in the choice of coding rates.

25 Claims, 12 Drawing Sheets

SPREAD SPECTRUM SYSTEMS WITH TRELLIS-CODED MODULATION

CROSS-REFERENCE TO RELATED APPLICATION

This application claims priority from Provisional Application No. 60/085,575, filed May 15, 1998 entitled "Spread Spectrum Systems with Trellis-Coded Modulation".

FIELD OF THE INVENTION

The present invention generally relates to spread spectrum communication, more particularly to coding and modulation.

BACKGROUND OF THE INVENTION

Spread spectrum techniques are employed in numerous communication systems, for example, where security, interference rejection and multiple access capability are of particular concerns. The attendant advantages of a spread spectrum system are low probability of interception/detection (LPI/LPD), code-division multiple access, high processing gain to resist jamming, effective elimination of multi-path interference, and countering inter-symbol interference. Spread spectrum technology is deployed in such systems as mobile radio networks and satellite networks.

Spread spectrum is a modulation technique that uses a pseudo-noise (PN) code sequence to "spread" the input signal. As a result, the modulated/encoded signal is transmitted across a bandwidth that exceeds the minimum necessary bandwidth. The receiver locally produces a correlated signal by generating the same PN code sequence, synchronizing its code sequence with that of the received code sequence. The receiver is thus able to track the received encoded signal for proper recovery of the input data stream.

In real communication systems, the channel that the modulated signal propagates over is noisy or otherwise exhibits poor channel response. To improve system performance, error correction codes are used. These error correction codes fall into two broad categories: block codes and trellis codes. Block codes operate on a fixed-length block of source messages in which these fixed-length blocks are independently encoded and decoded. With trellis codes, the input data stream is not partitioned into fixed-length blocks. Instead, the variable length input message is mapped into a code stream of a correspondingly arbitrary length. Trellis codes are more fully discussed later.

In traditional spread spectrum systems, error correction coding and modulation are two separate and distinct sequential processes. FIG. 12 shows a conventional spread spectrum system with error correction coding. The transmitter 1201 includes a channel uncoded source 1203, which generates an input signal. The channel encoder 1205 encodes the input signal from the uncoded channel source 1203 using a conventional error correction technique and supplies the resultant signal to a modulator 1207. The modulator 1207, in turn, outputs a modulated signal to the spreader 1209, which spreads the modulated signal with a PN code before being transmitted over the channel 1211. At the receiver 1213, the received signal is despread by a despreader 1215 with the same PN code. The despread signal then is demodulated by a demodulator 1217. The demodulated signal is finally passed to a Viterbi decoder 1219 for decoding to reconstitute the original uncoded data.

In practical spread spectrum systems, the transmitted signal bandwidth is limited, but the systems are usually required to maintain a minimum amount of processing gain. If the code rate of the channel encoder 1205 is assumed to be $\alpha$, the bandwidth of the modulated channel encoded data is then increased by $1/\alpha(0<\alpha<1)$. It is noted that the coding gain of the error correction code depends on the code rate. The signal bandwidth, after spreading, is further increased by N, if the PN code length is N. The total bandwidth expansion ratio is thus $(1/\alpha) \times N$. To improve coding gain, the code rate is decreased, which results in bandwidth expansion. To maintain the same bandwidth, it is required that the length of the PN code be decreased. Consequently, the processing gain of the system is reduced if coding gain is increased. On the other hand, to increase processing gain, the PN code length needs to be increased, making the code rate higher. This will degrade the coding gain. Also, the choice of available code rates is limited. Therefore, in a spread spectrum system with conventional error correction coding, the bandwidth expansion poses a problem for achieving high coding gain and processing gain simultaneously in a bandwidth-limited band in that one is a trade-off for the other. Based on the foregoing, there is a clear need for a mechanism that achieves high coding gain without a decrease in processing gain, or vice versa.

There is also a need for a mechanism that provides flexibility in choice of code rates for acceptable coding gain without bandwidth expansion penalty.

SUMMARY OF THE INVENTION

According to one aspect of the present invention, a spread spectrum communication system comprises a transmitter circuit that generates a signal using trellis-coded modulation. The signal is encoded and modulated based upon a plurality of input source symbols. A receiver circuit receives and decodes the signal, thereby, outputting the input source symbols. This system advantageously achieves high coding gain without decreasing processing gain.

Another aspect of the present invention provides a method for communicating in a spread spectrum system. The method includes encoding and modulating a signal based upon input source symbols using trellis-coded modulation. The method further includes transmitting the encoded signal and subsequently receiving the encoded signal. The received encoded signal is then decoded to recover the input source symbols. The above method provides flexibility in choice of coding rates.

In another aspect of the present invention, a spread spectrum transmitter comprises a data source that generates a binary data stream. A trellis-coded modulator is configured for encoding the binary data stream and correspondingly outputting an encoded signal based upon a selected signal constellation. The trellis-coded modulator maps the binary data stream to a signal point in the selected signal constellation by set partitioning. The mapping of the binary data stream is executed using a look-up table. A spreader spreads the encoded signal based upon a pseudo-noise (PN) code sequence. As a result, secure communication can be obtained without sacrificing bandwidth efficiency.

In yet another aspect of the present invention, a spread spectrum receiver comprises a despreader for despreading a received encoded signal that has been encoded and modulated using trellis-coded modulation. A Viterbi decoder decodes the received encoded signal. The receiver also includes memory for storing truncated path metrics associated with the decoding of the received encoded signal. This arrangement provides for a high code gain.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A spread spectrum system using trellis-coded modulation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Two exemplary types of spread spectrum systems are discussed below: (1) direct sequence (DS) systems, and (2) frequency hoping (FH) systems. In DS systems, the pseudo-noise (PN) code is phase shifted (i.e., PSK) at a rate that is an integer multiple of the bit rate. In contrast, FH systems operate under a frequency shift keying (FSK) scheme, whereby the PN code is used to select the carrier frequency of the transmitted signal on a pseudo-random basis. Although the present invention is discussed with respect to these two spread spectrum systems, it should be appreciated that one of order skill in the art would recognize that the present invention has applicability to other types of spread spectrum systems as well.

Figure 1:
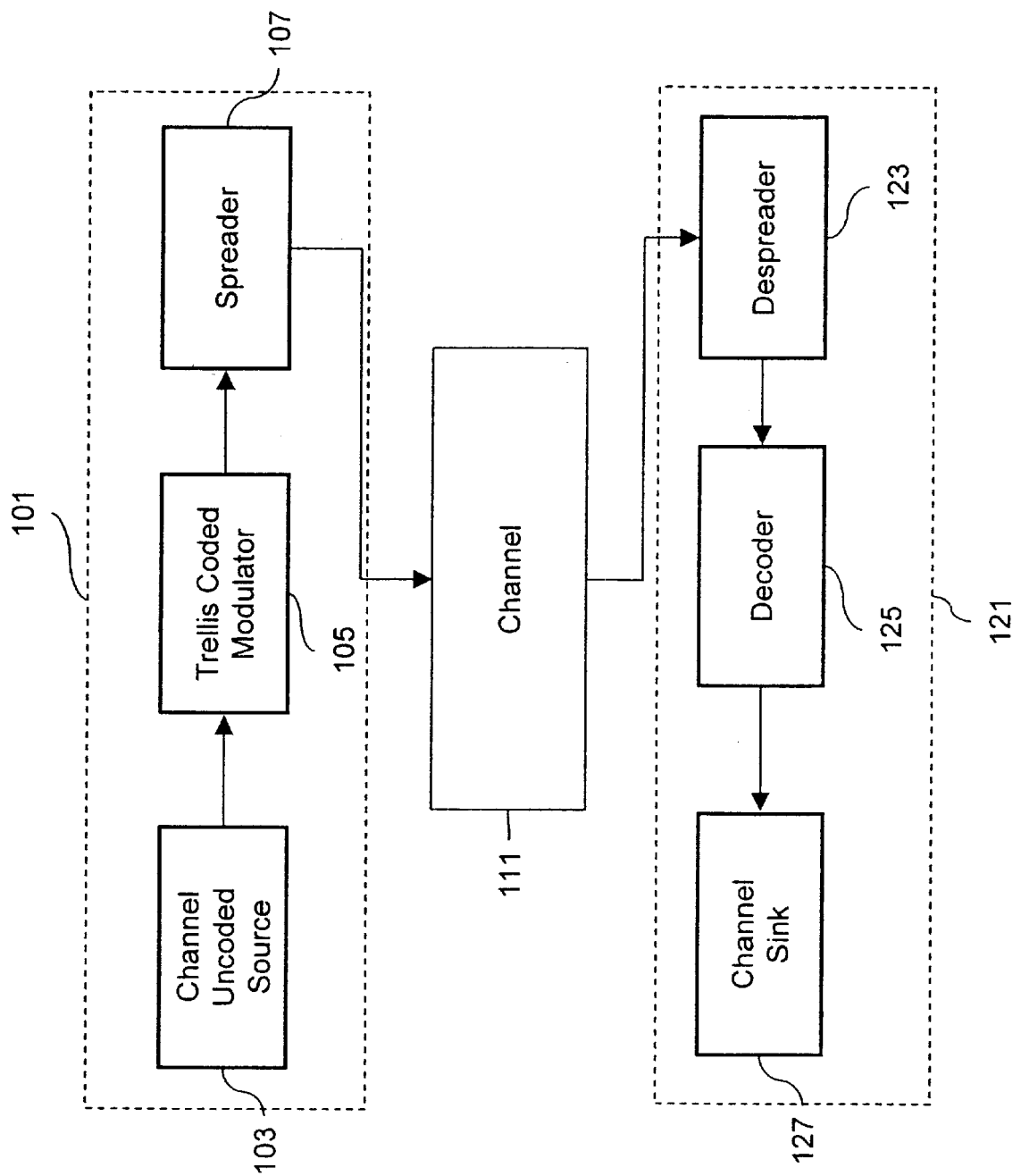
FIG. 1 is a block diagram of a spread spectrum system in accord with an embodiment of the present invention.
Figure 12:
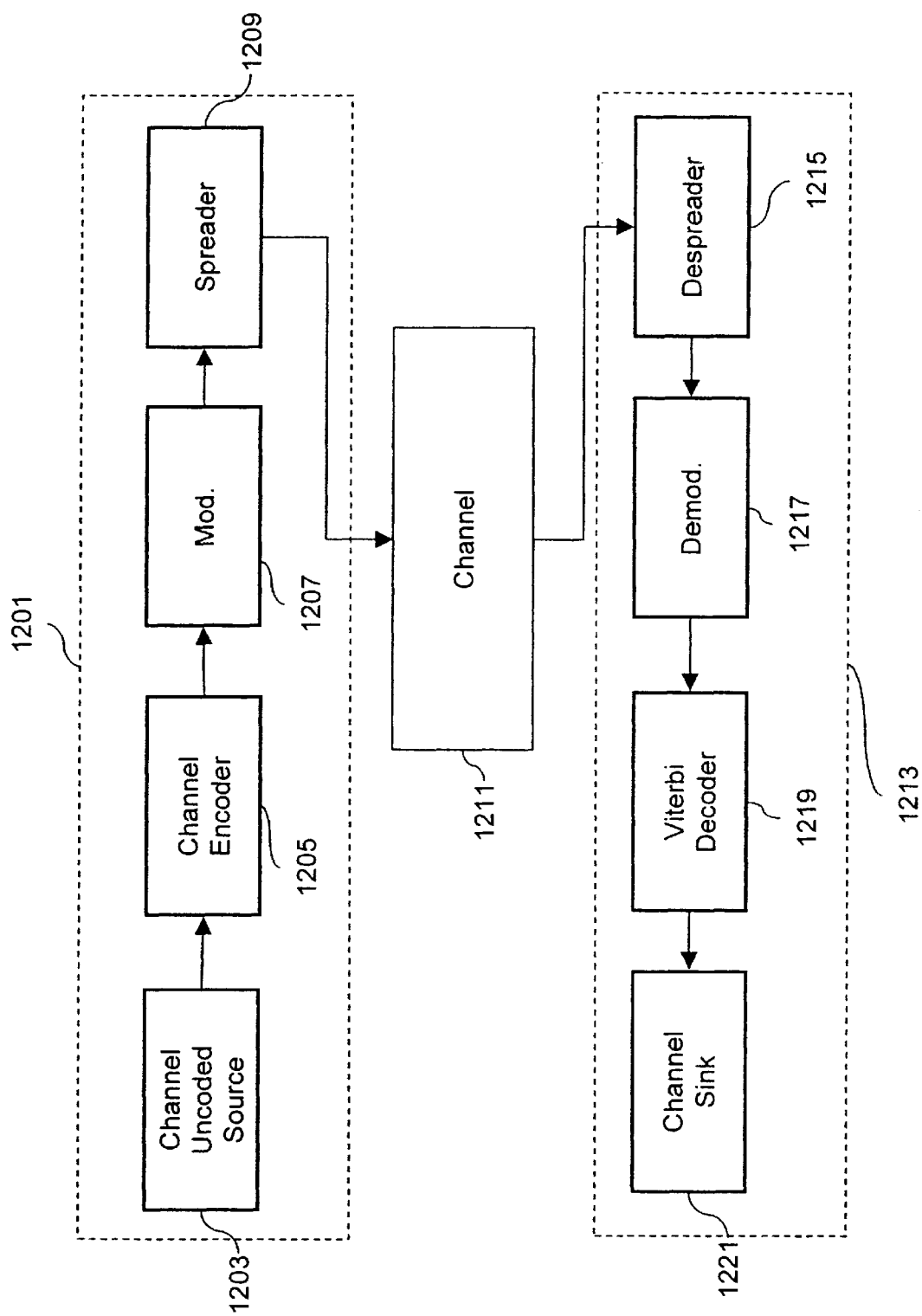
FIG. 12 is a block diagram of a conventional spread spectrum system.

FIG. 1 shows a general spread spectrum system employing trellis-coded modulation (TCM) according to an embodiment of the present invention. The transmitter 101 includes a channel uncoded source 103 that supplies an input signal, which is typically a digital data stream, to the trellis-coded modulator 105. The mechanics of the trellis coding is discussed later with respect to FIGS. 2, 3 and 4. The modulated signal, in turn, is supplied by the trellis-coded modulator 105 to spreader 107. At this point, it is apparent that this approach differs from the conventional system of FIG. 12 in that the coding and modulation processes are combined into one single process. The coding gain, as will become evident later, is achieved by the expansion of the signal constellation without concomitant expansion of the bandwidth. In one exemplary embodiment, the signal constellation is an M-ary PSK; alternatively, another embodiment contemplates use of a QAM signal constellation. Because bandwidth expansion is not incurred under this arrangement, the bandwidth expansion ratio for spreading via the spreader 107 can be solely determined by the ratio between the transmitted signal bandwidth and the data bandwidth. Assuming this ratio is denoted by $\beta$, the processing gain (PG) of the system is governed by the following equation:

$$PG = 10 \log_{10} \beta \, \text{dB} \qquad (1)$$

Further, the coding gain is due to the increased signal alphabet (i.e., constellation points), which accommodates the additional code bits and the inter-dependency among the signals. To maximize the coding gain, the set partitioning method is used (discussed below) for signal assignment.

As seen in FIG. 1, the spreader 107 places the encoded signal onto the channel 111. Receiver 121, which includes a despreader 123, a decoder 125, and a channel sink 127, receives the corrupted encoded signal to recover the original signal emanated from the channel uncoded source 103. The despreader 123 despreads the received signal and outputs to the decoder 125, which decodes the trellis-coded modulation signal and supplies the recovered signal to channel sink 127.

The trellis-coded modulator 105 performs both the coding and the modulation function. The modulator 105 employs a multilevel/phase modulation signaling set with a state-oriented trellis coding scheme. The coding scheme, in the preferred embodiment, is convolutional coding; in the alternative, block codes can be utilized. In the case of convolutional coding, decoder 125 is a Viterbi decoder, which is further discussed later. If block coding is used, decoder 125 is a block decoder implementing a corresponding decoding mechanism. The present invention is described herein with respect to use of convolutional codes in the TCM spread spectrum system. In this case, trellis encoding involves, conceptually, the mapping of an arbitrarily long input message sequence to an arbitrarily long code stream without a block structure. In essence, the trellis encoder within the trellis-coded modulator 105 can be viewed as a finite state machine. Assuming k bits are to be transmitted per modulator symbol, one possible signal constellation would be $2^{k+1}$. There is a further assumption that j bits enter the encoder (i.e., modulator 105) and leaves k–j bits uncoded. In an exemplary embodiment, the encoder 105 is a binary convolutional encoder with 1 bit of redundancy, producing k+1 bits. The modulator 105 then produces a signal from a signal constellation with alphabet size of $2^{k+1}$. The code rate of the trellis-coded modulator 105 can be defined as k(k+1).

Because the TCM scheme combines coding and modulation into a single process, high coding gain can be attained without the undesirable effect of bandwidth expansion. Under this approach, the received signal is demodulated and decoded simultaneously. In one exemplary embodiment, bandwidth expansion may be avoided by using a MPSK or QAM signal set, thereby exploiting the redundancy resulting from the expansion.

Figure 2:
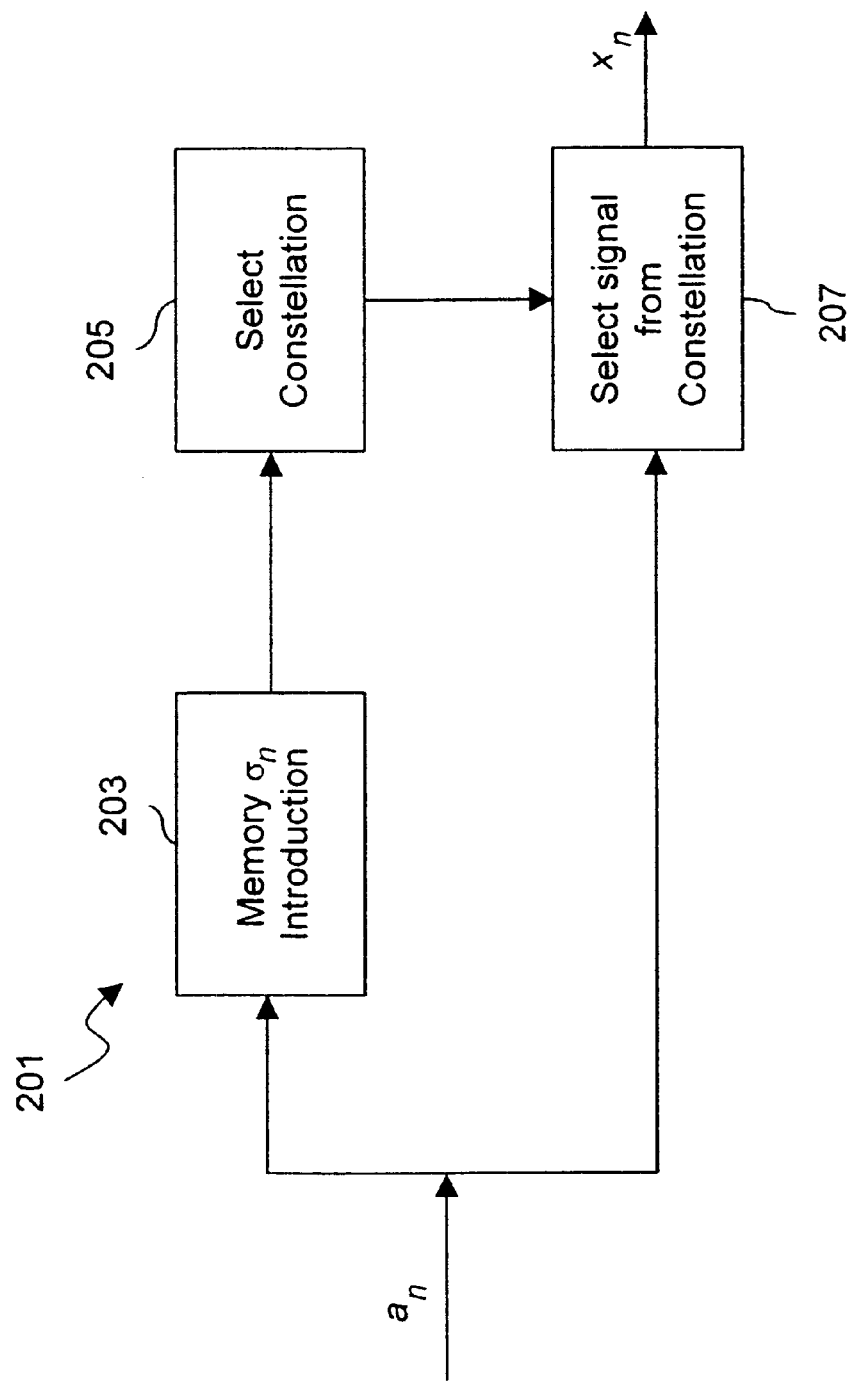
FIG. 2 is a block diagram of a trellis-coded modulation (TCM) scheme in accord with an embodiment of the present invention.

FIG. 2, shows a general model for the TCM with $a_n$ as the current source symbol. First, this symbol enters memory 203, which stores the previous states, denoted as $\sigma_n$, of the trellis encoder 201. In process 205, the signal constellation is selected; for example, as discussed above, the constellation could be from a MPSK or QAM signal set. Next in process 207, a particular signal is chosen from the selected constellation, resulting in an output transmit signal, $x_n$. It should be noted that an is concurrently stored in memory 203 and is used by the process 205; this simply indicates that the selection of $x_n$ is a function of the current source signal and the previous source signals, as evident by the following equation:

$$x_n = f(a_n, a_n, \ldots, a_n-L) \quad (2)$$

In addition, the $\sigma_n$ may be defined as the state of the encoder at time n, as follows:

$$\sigma_n = (a_n, a_n, \ldots, a_n-L) \quad (3)$$

Accordingly, the finite state machine can be characterized in the following manner:

$$x_n = f(a_n, \sigma_n) \quad (4)$$

$$\sigma_n + 1 = g(a_n, \sigma_n) \quad (5)$$

where the function, $f(a_n, \sigma_n)$, shows the mapping of channel symbols and $g(a_n, \sigma_n)$ shows the progression of the encoder/modulator states. Equations (4) and (5) clearly indicate that the current channel symbol, $x_n$, and the next state, $\sigma_{n+1}$, are based upon the current input, $a_n$, as well as the current state, $\sigma_n$.

Figure 3:
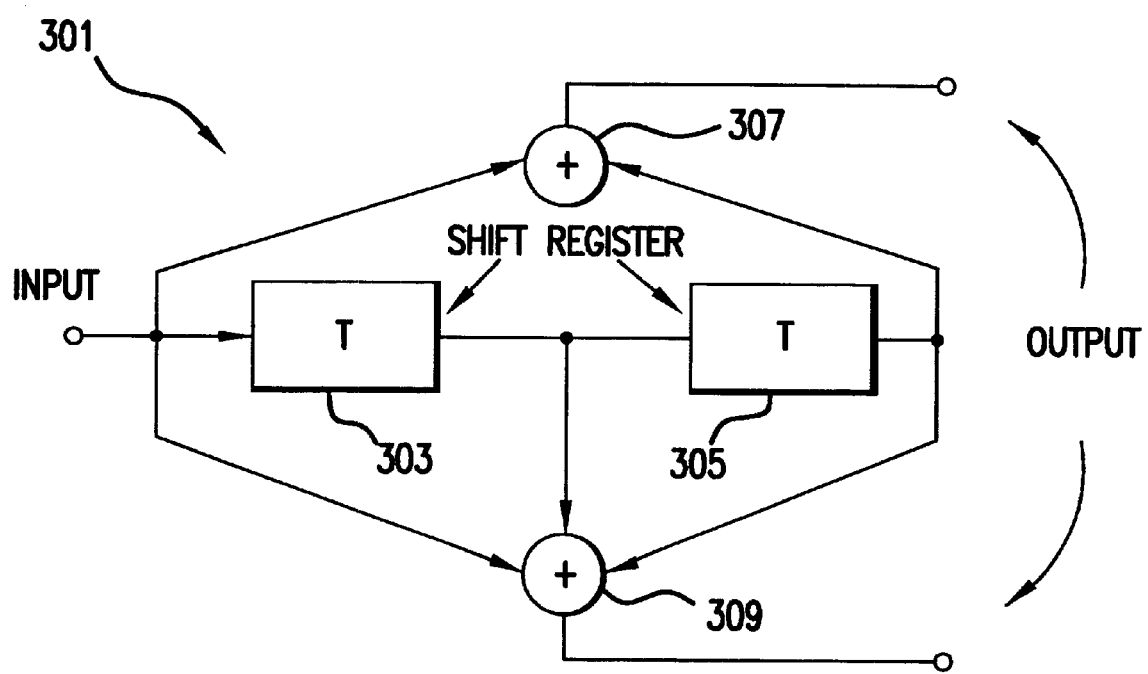
FIG. 3 is a block diagram of an exemplary code generator that may be used in the system of FIG. 1.
Figure 4:
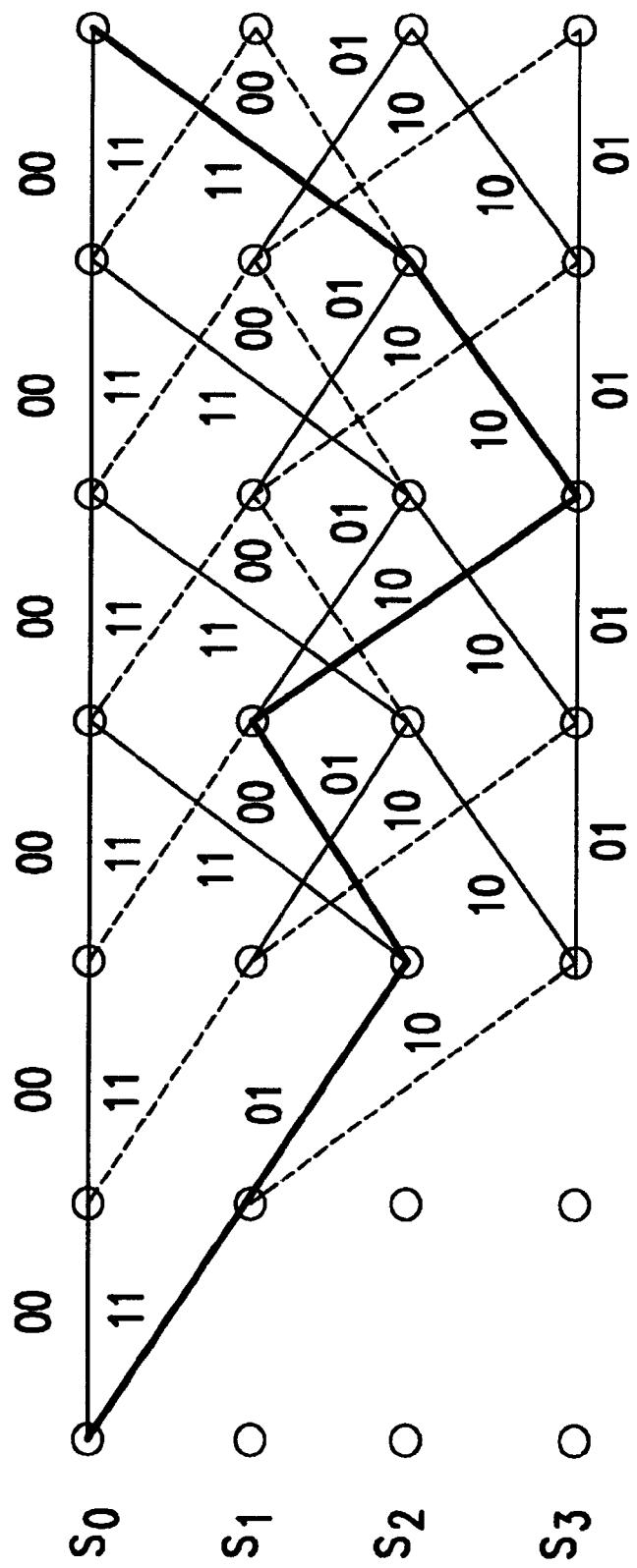
FIG. 4 illustrates an exemplary trellis diagram corresponding to the code generator of FIG. 3.

Convolutional codes are characterized by three integer parameters: n (output bit rate), k (input bit rate), and K, where k/n is the code rate and K represents the number of k-tuple stages in the encoding shift registers. FIG. 3 shows a rate ½ convolutional code generator 301 with the constraint length of 2. The generator 301 includes two shift registers 303 and 305 and two binary adders 307 and 309. FIG. 4 illustrates the resultant trellis diagram for an exemplary input sequence of 101100 into the code generator 301 of FIG. 2. To interpret the diagram, a solid line corresponds to a "0" input, and a dotted line specifies a "1" input. The thick solid line denotes the output sequence (or trellis path). Assuming the input sequence is entered from left to right, the first input bit is a "1", corresponding to "11." As seen in FIG. 3, to arrive at this output, a "1" is at the input of the code generator 301, and shift registers 303 and 305 both have 0 values. Thus, the top adder 307 yields 1 (i.e., 1+0), and the bottom adder 309 computes 1+0+0, which equals 1. Next, the input bit is "0", resulting in a "01" output. That is, the previous "1" input is placed in shift register 303, and the current input is a "0". Shift register 305 still has a "0". In this case, the adder 307 adds 0 and 0 to yield 0. Adder 309 computes 0+1+1, which equals 1. The third input bit of "1" results in a "00" output. In FIG. 3, with this third input bit, the "1" in register 303 is shifted to register 305, and the previous input of "0" is placed in register 303. Accordingly, adder 309 computes 1+0, which is 1; adder 309 adds 1+0+1, which equals 0. This mapping continues until the last bit is shifted through the generator 301. The complete output sequence is 11 01 00 10 10 11.

The Ungerboeck set partitioning method used in an embodiment of the TCM system is described as follows. Because of the limitations in symbol transitions introduced by trellis coding, error performance is not determined by closest neighbors in the signaling set. Instead, minimum free Euclidean distances dictate error performance. Proper coding ensures that the free Euclidean distance will be greater than the minimum Euclidean distance in the uncoded signal constellation.

Let $d(a_n, b_n)$ denote the Euclidean distance between two symbols $a_n$ and $b_n$ at time n. The trellis modulator 105 seeks to maximize the free Euclidean distance, $d_{free}$:

$$d_{free} = \min[\Sigma d^2(a_n, b_n)]^{1/2}, \forall \{a_n\} \neq \{b_n\} \quad (6)$$

where $\{a_n\}$, $\{b_n\}$ are two sequences of symbols. This optimization is ensured by the set partitioning method. For example, the method first successively partitions an M-ary constellation into 2, 4, 8, and etc. subsets with respective sizes M/2, M/4, M/8, and etc. These partitions have progressively larger minimum distances $d(^1)_{min}$, $d(^2)_{min}$, $d(^3)_{min}$, and etc. The assignment rules are as follows: members of the same partition are assigned to parallel transitions, and members of the next larger partition are assigned to adjacent transitions. Further, it is assumed that all the signals are used with equal frequency.

In conventional coding applications, redundancy entails transmission of less information, resulting in a reduction in code rate and expansion of bandwidth. However, with TCM, coding is utilized to increase the Euclidean distances between permissible symbols instead of performing error correction. Thus, redundancy is achieved through an increased signal alphabet in the modulation constellation to accommodate the added code bits and their inter-dependency among the signals.

An optimum decoding algorithm for convolutionally encoded signals is the Viterbi decoding algorithm. The Viterbi algorithm starts from a predetermined initial state and computes the maximum likelihood function for each possible path remerging at a specific state (node on the trellis diagram). When used in decoding TCM signal, Euclidean distance measures the path metric. At each node, it compares the path metrics of the different paths arriving at the same state. The path with the smallest metric (i.e., closest match), the survivor, is preserved and is stored at each node level together with the associated path metric. This computation is executed iteratively to yield the path with the least path metric through the trellis. The decisions are made at those states where two paths merge together, whereby only the survivors are captured at each state transition.

Direct-Sequence System

Figure 5:
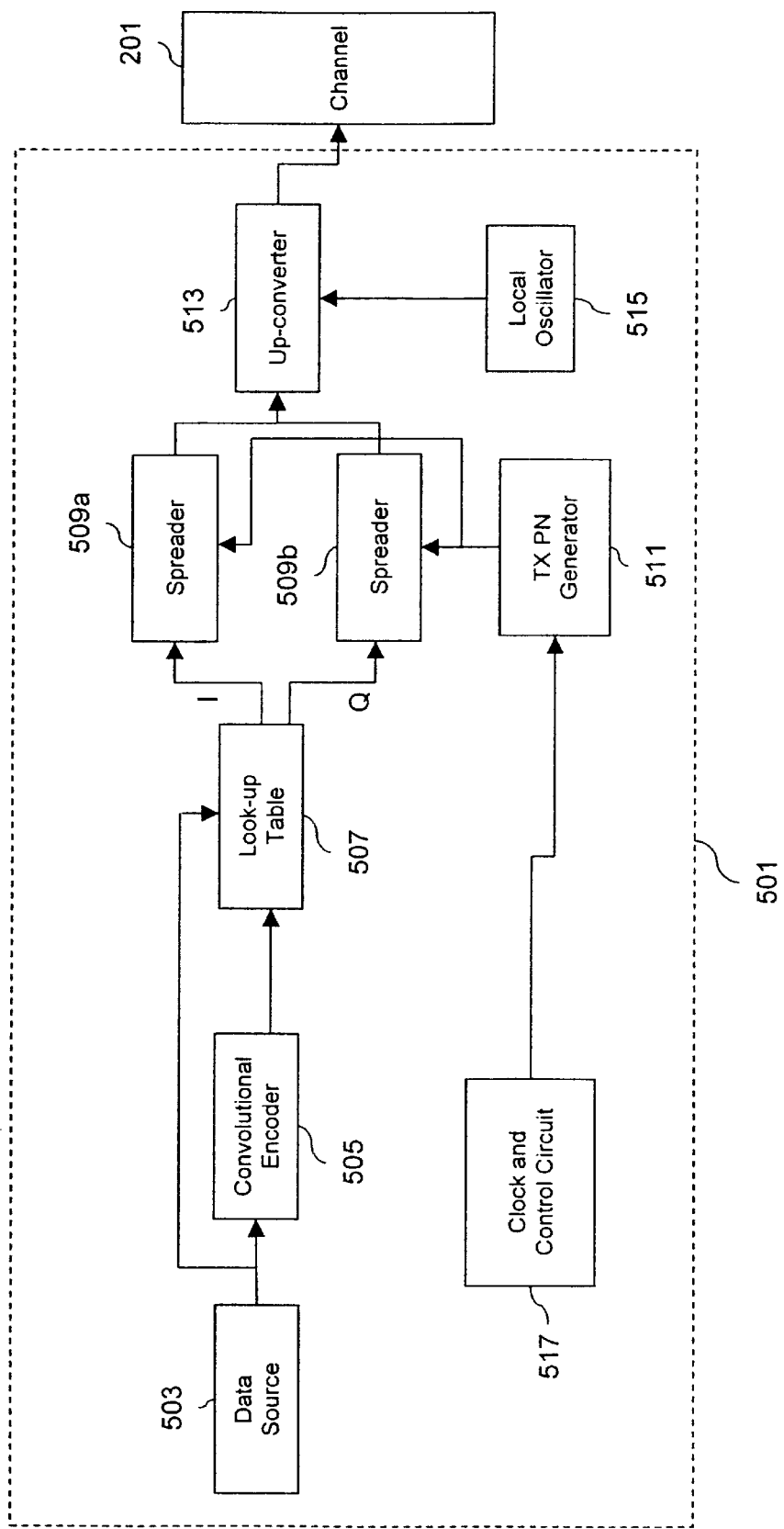
FIG. 5 is a block diagram of a transmitter in a direct-sequence spread spectrum system in accordance with an embodiment of the present invention.

FIG. 5 shows a block diagram of a transmitter 501 of a direct-sequence spread spectrum with TCM according to one embodiment of the present invention. A data source 503 supplies an input data stream concurrently to a convolutional encoder 505 and a look-up table 105. The presence of the uncoded bits determine the sub-constellation from which the transmitted signal has to be chosen while the coded bits determine the signal points in the sub-constellation. The output of the convolutional encoder 505 is also input to the look-up table 105, where a proper signal within the constellation is located. The output of the table 507 contains two components: an in-phase (I) signal, and the other a quadrature phase (Q) signal. These two signals are then spread by spreaders 509a and 509b, respectively, by a PN code. A transmit PN generator 511 generates the PN code sequence to each of the spreaders 509a and 509b. The clock and control circuit 517 ensures proper timing relationship between the PN code and the I and Q signals by generating all the necessary clock signals and control signals. Next, the spread I signal and the spread Q signal are converted into an analog signal, which is up converted by up-converter 513 onto a carrier for transmission over the channel 201. Local oscillator 515 provides the carrier frequency to the up-converter 513.

Figure 6:
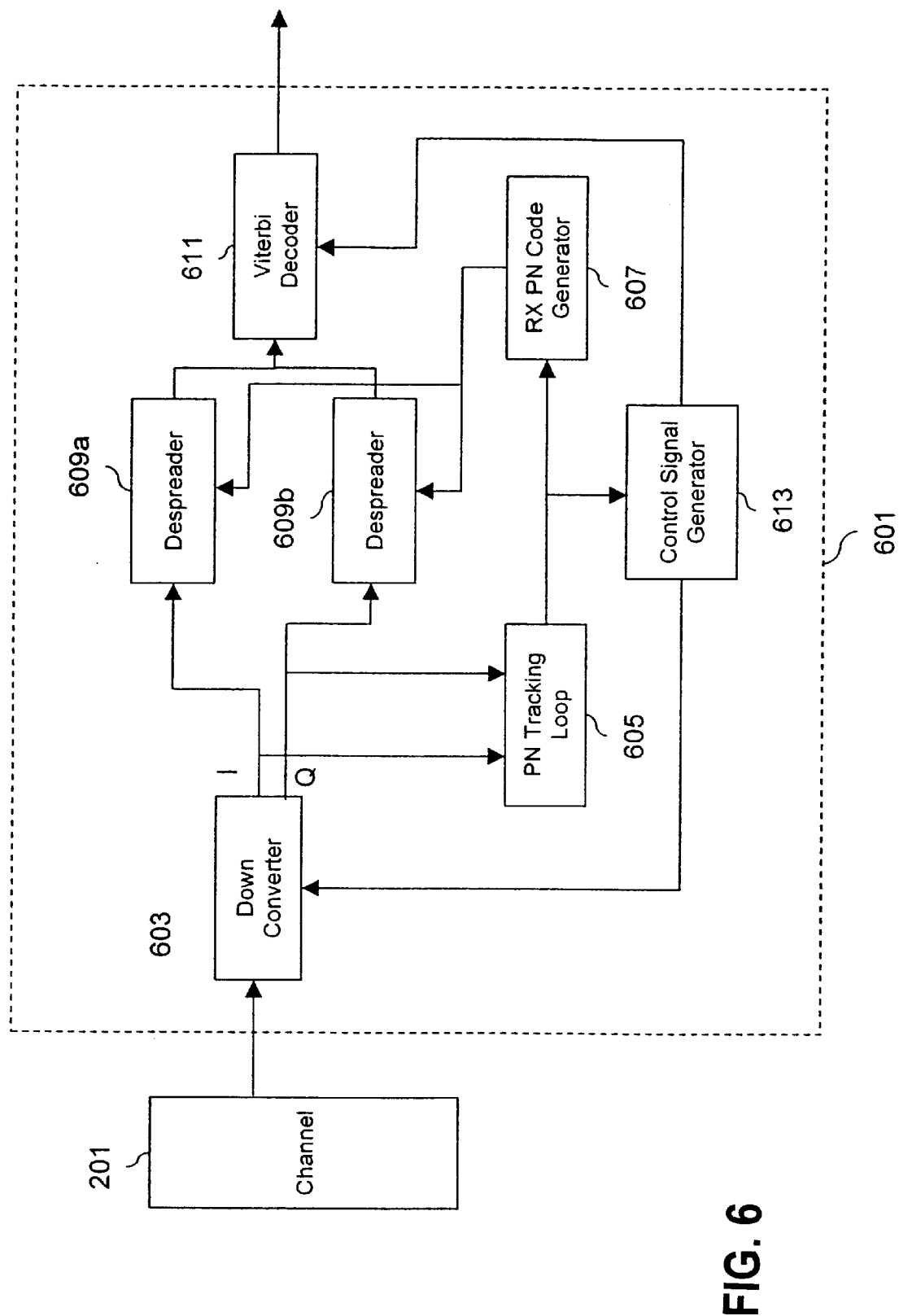
FIG. 6 is a block diagram of a receiver in a direct-sequence spread spectrum system in accordance with an embodiment of the present invention.

The modulated signal propagates over the channel 201 and is received by receiver 601, as shown in FIG. 6. The received signal is down-converted. It is then sampled and quantized by two analog-to-digital (A/D) converters (not shown) into two signals: the I signal and the Q signal. The receiver (RX) PN code generator 607 generates PN codes to despreaders 609a and 609b, which despread the I and Q signals, respectively. The RX PN code generator 607 is clocked by the output signal of a PN tracking loop 605. The PN tracking loop 605 ensures the synchronization of the local PN code with that of the received signal. The parallel despread signals are passed to a Viterbi decoder 611 for decoding and demodulation. The Viterbi decoder 611 outputs the recovered data stream. In an exemplary embodiment, the metric used in the Viterbi decoder 611 is the Euclidean distance between the constellation points.

Figure 7:
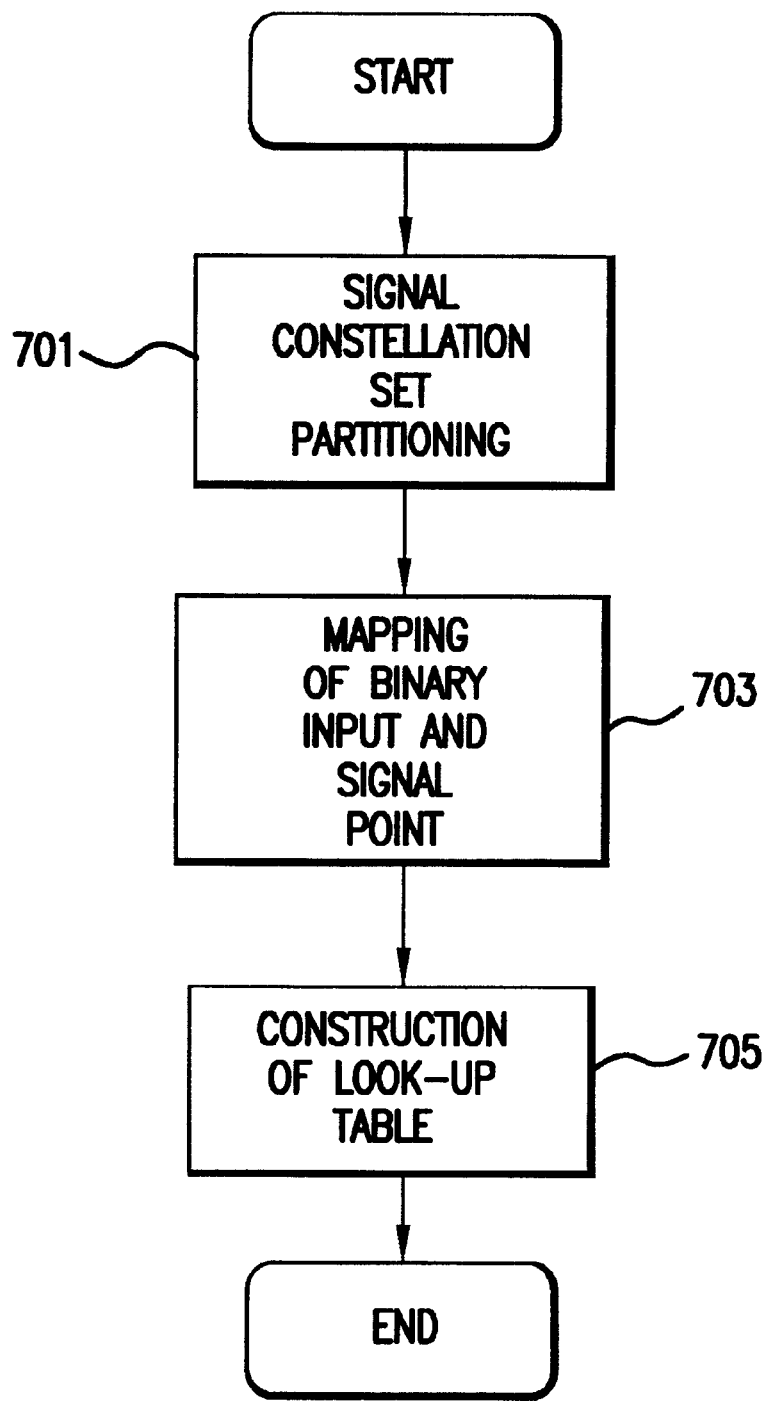
FIG. 7 shows the generation of a look-up table utilizing the Ungerboeck method according to an embodiment of the present invention.

FIG. 7 shows a flow diagram of the generation of the look-up table 507 (FIG. 5). The generation of this table 507 is essentially accomplished in two steps. First, the signal constellation, per step 701, is set partitioned using the Ungerboeck method. Next, the binary input stream is mapped to corresponding signal points in the constellation (step 703). The mapping is then stored in a look-up table 507. By implementing a look-up table, the processing time is improved.

Figure 8:
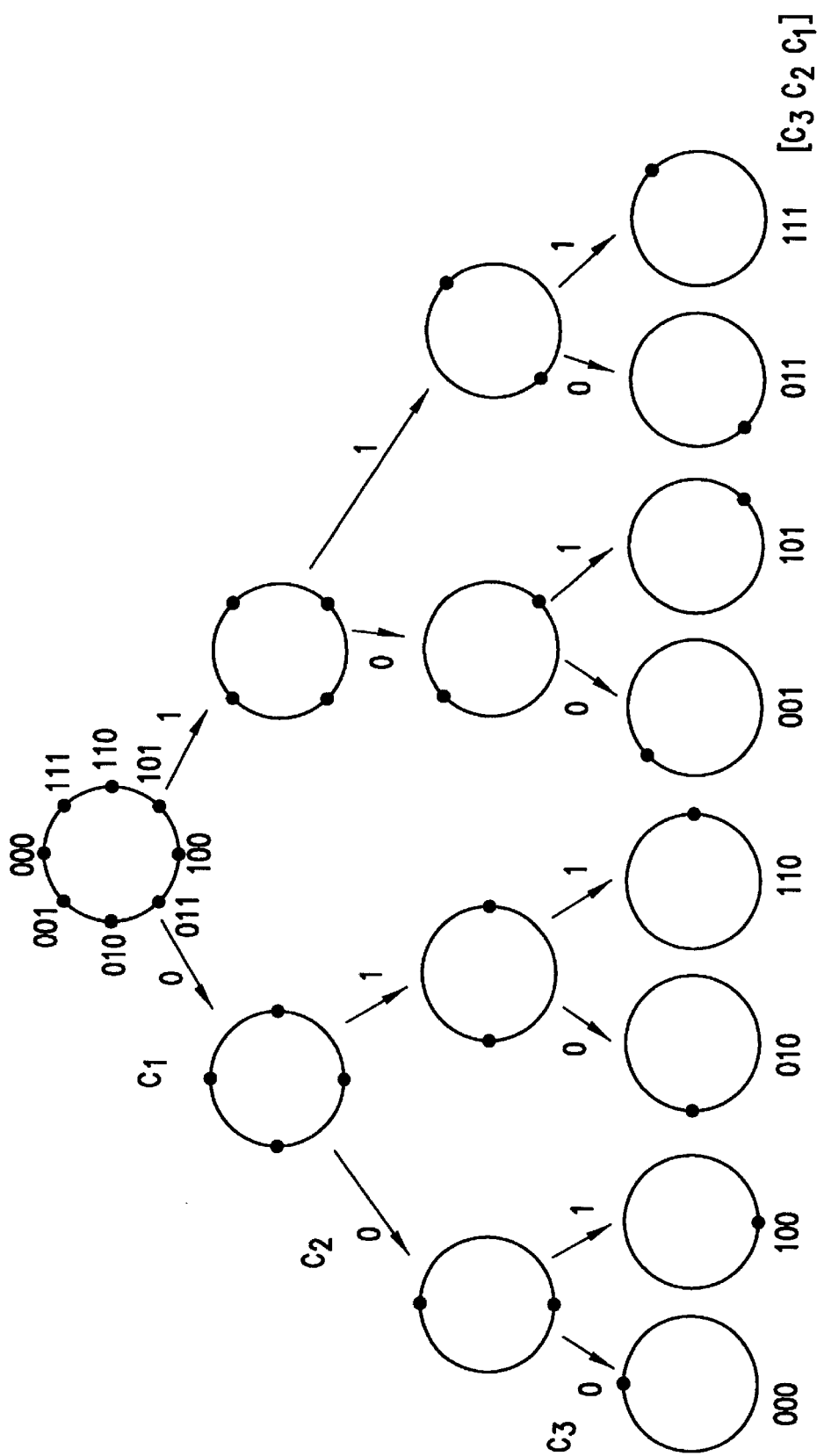
FIG. 8 is a diagram of Ungerboeck's set partitioning of an 8-PSK signal constellation in accordance with an embodiment of the present invention.

FIG. 8 provides an example of the Ungerboeck set partitioning method of an 8-PSK signal constellation. Table 1 below lists the I and Q signals' amplitude and associated signal

TABLE 1

| SIGNAL LABEL | I | Q |
|---|---|---|
| 000 | 0 | 1 |
| 001 | $-1/(2)^{1/2}$ | $+1/(2)^{1/2}$ |
| 010 | $-1$ | 0 |
| 011 | $-1/(2)^{1/2}$ | $-1/(2)^{1/2}$ |
| 100 | 0 | $-1$ |
| 101 | $+1/(2)^{1/2}$ | $-1/(2)^{1/2}$ |
| 110 | 1 | 0 |
| 111 | $+1/(2)^{1/2}$ | $+1/(2)^{1/2}$ |

It should be noted that the look-up table 507 is dependent upon the modulation technique used and the D/A dynamic range. The I signal and Q signal amplitudes can vary accordingly. The I and Q signal attitudes shown in Table 1 can be represented in an exemplary embodiment by signed integer format. With use of the signed integer format, the spreading by spreaders 509a and 509b accomplished by performing the XOR (exclusive OR) function on the most significant bit of the binary date with the spread code, which is also in binary format. Thus if the data is in signed integer format, the spreading is equivalent to "XORing" all the data binaries with the spread code.

Figure 9:
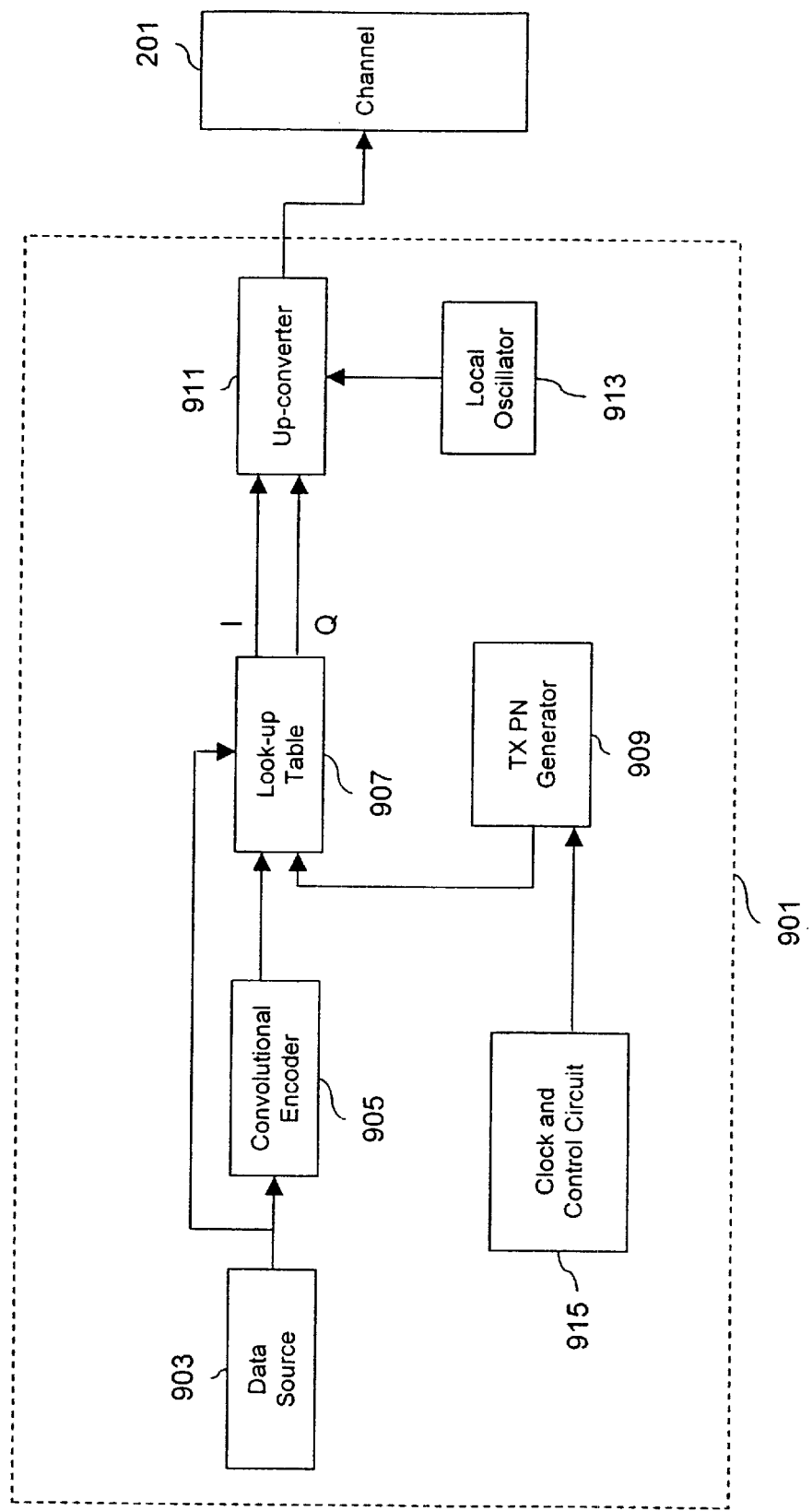
FIG. 9 is a block diagram of a transmitter in a direct-sequence spread spectrum system in accordance with an embodiment of the present invention.

In another embodiment of the present invention, as shown in FIG. 9, a transmitter 901 incorporates the spreading process into the look-up table. As in the system of FIG. 5, a data source 903 outputs an input data stream. The input data stream is received by the convolutional encoder 905 and the look-up table 907. In this particular transmitter 901, TX PN generator 909 supplies a PN code sequence as input to the look-up table 907. The signal mapping and spreading are executed through a look-up table. Exemplary values for the look-up table 907 is listed below in Table 2.

TABLE 2

| SIGNAL LABEL/ SPREAD CODE | I | Q |
|---|---|---|
| 000/0 | 0 | 1 |
| 001/0 | $-1/(2)^{1/2}$ | $1/(2)^{1/2}$ |
| 010/0 | $-1$ | 0 |
| 011/0 | $-1/(2)^{1/2}$ | $-1/(2)^{1/2}$ |
| 100/0 | 0 | $-1$ |
| 101/0 | $+1/(2)^{1/2}$ | $-1/(2)^{1/2}$ |
| 110/0 | 1 | 0 |
| 111/0 | $+1/(2)^{1/2}$ | $+1/(2)^{1/2}$ |
| 000/1 | 0 | $-1$ |
| 001/1 | $1/(2)^{1/2}$ | $-1/(2)^{1/2}$ |
| 010/1 | $+1$ | 0 |
| 011/1 | $1/(2)^{1/2}$ | $1/(2)^{1/2}$ |
| 100/1 | 0 | 1 |
| 101/1 | $-1/(2)^{1/2}$ | $+1/(2)^{1/2}$ |
| 110/1 | $-1$ | 0 |
| 111/1 | $-1/(2)^{1/2}$ | $-1/(2)^{1/2}$ |

As seen from Table 2, when the PN code is zero, or low-voltage, the I signal and Q signal amplitudes do not change polarity; however, when the code is one, the I signal and Q signal amplitudes have the opposite polarity. In this case, the representation of I/Q signal amplitudes can be independent of the format used.

Frequency-Hopping System

Figure 10:
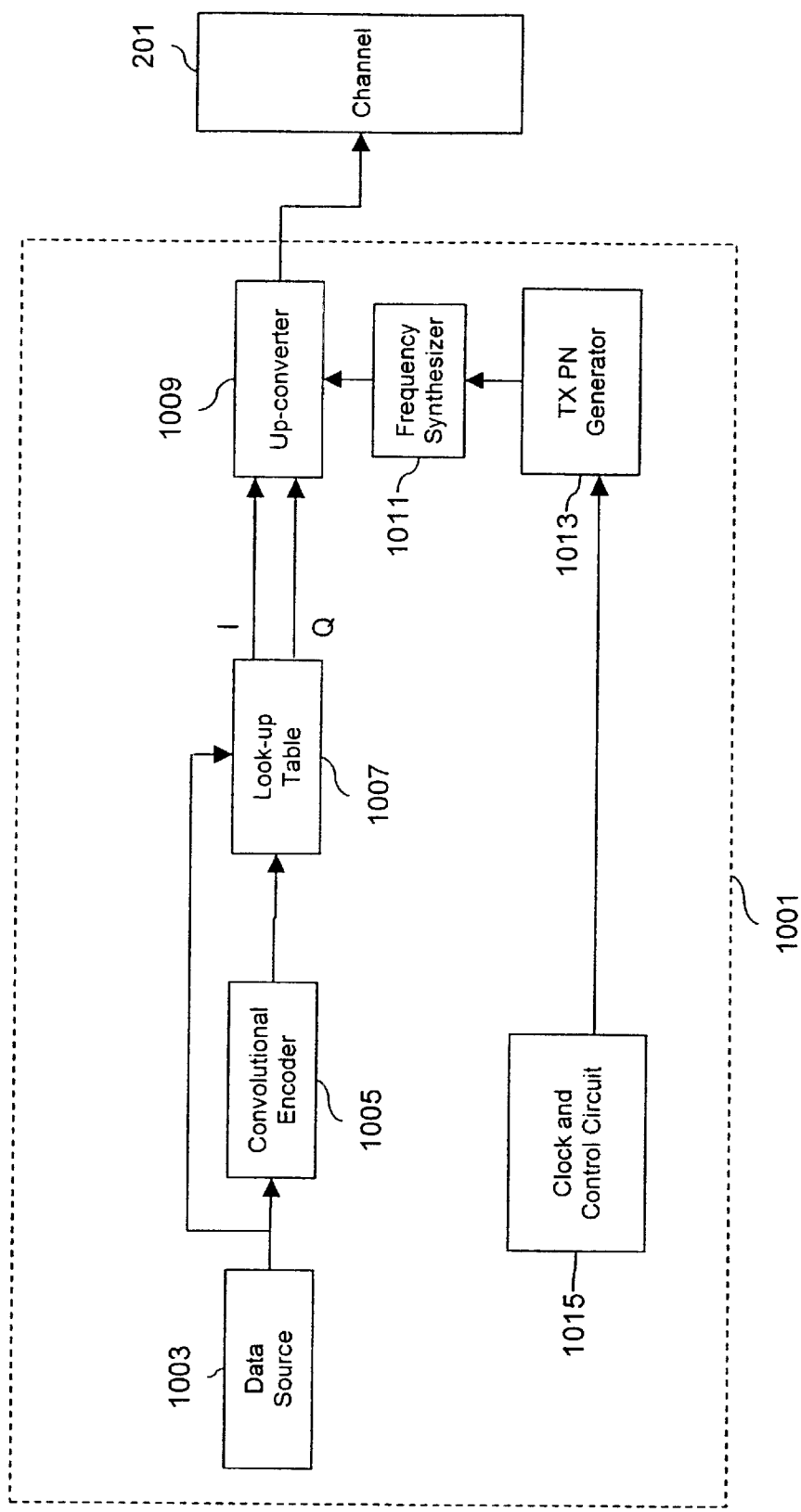
FIG. 10 is a block diagram of a transmitter in a frequency-hopping spread spectrum system in accordance with an embodiment of the present invention.

In an alternative embodiment, the TCM approach can be implemented in a frequency-hopping spread spectrum system. FIG. 10 shows a transmitter 1001 of such a system whereby a data source 1003 outputs an uncoded input data stream to a convolutional encoder 1005 and a look-up table 1007. The convolutional encoder 1005 encodes the input data stream and provides it to the look-up table 1007 to select the signal constellation. That is, the uncoded input data stream and the coded data stream are needed to locate the proper signal point from the look-up table 1007. The look-up table 1007 yields the corresponding I signal and the Q signal, which are converted to analog signals and then provided to the up-converter 1009 for transmission across the channel 201. The look-up table 1007 incorporates the spreading function and is populated in similar fashion as that of the DS spread spectrum transmitter of FIG. 5. The up-converter 1009 mixes the analog signals with a carrier frequency that is generated by a frequency synthesizer 1011. The selection of the carrier frequency is controlled by a transmitter (TX) PN generator 1013, which supplies the PN code sequence. The carrier frequencies are distributed across the allowable transmitted bandwidth. The timing and control signals within the transmitter 1001 is provided by the clock and control circuit 1015.

Figure 11:
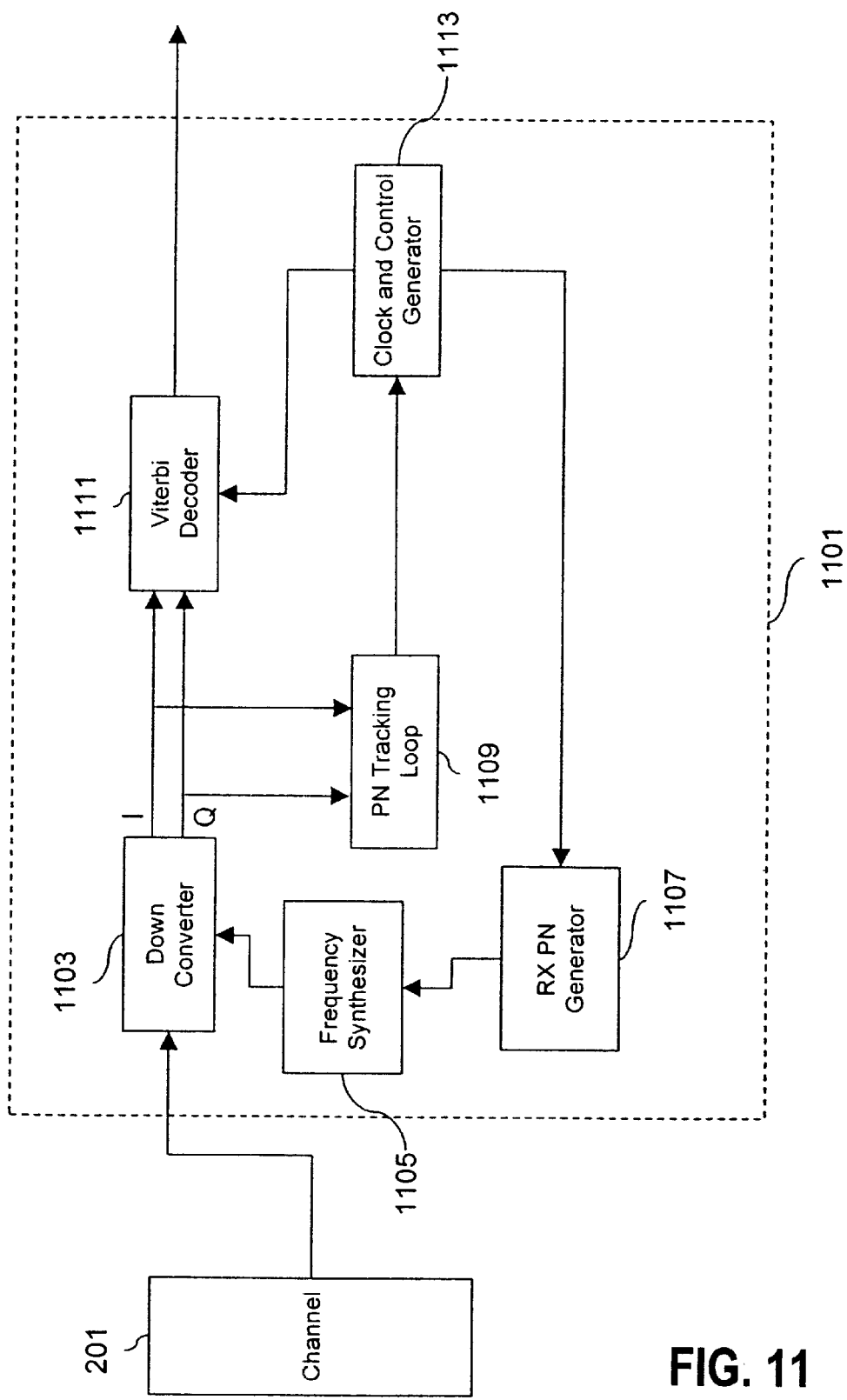
FIG. 11 is a block diagram of a receiver in a frequency-hopping spread spectrum system in accordance with an embodiment of the present invention.

FIG. 11 illustrates a receiver 1101 that is used to recover the transmitted signal sent from the transmitter 1001. Down converter 1103 receives the transmitted signal and down converts it into the I signal and the Q signal. A frequency synthesizer 1105 supplies the carrier frequencies for the down conversion process. In addition, a RX PN generator 1107 provides the frequency synthesizer 1105 with the PN code sequence. The I and Q signals are then simultaneously passed through an A/D converter (not shown). The digitized I signal and Q signal are passed to a Viterbi decoder 1111 for decoding and demodulation. Next, the Viterbi decoder 1111 outputs the recovered data. The decoding and demodulation process is supported by a clock and control signal circuit 1113, which is clocked by the output of a PN tracking loop 1109. Essentially, the clock and control signal circuit 1113 supplies the clock signal to the overall receiver 1101. For instance, circuit 1113 sends a clock signal to the RX PN generator 1107. As previously discussed in the other embodiments, the PN tracking loop 1109 ensures synchronization of the PN code with the carrier frequency timing of each symbol such that the change of the local carrier frequency generated by the frequency synthesizer 1105 matches that of the received signal.

According to the disclosed embodiments, a system and method for transmitting and receiving a signal uses a TCM scheme to achieve high coding gain without sacrificing processing gain. The transmitter of this spread spectrum system utilizes a look-up table to rapidly map the input data stream with a corresponding signal from the constellation. A bandwidth efficient constellation, such as QAM or MPSK, may be used. Moreover, in one embodiment, the look-up table incorporates the spreading process, further enhancing the speed of the encoding process. A key advantage of the present invention is that a TCM based spread spectrum system provides significant coding gain while maintaining the processing gain. Further, the present invention advantageously permits greater flexibility in the choice of coding rates.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A spread spectrum communication system comprising:
   a transmitter circuit for generating a signal using trellis-coded modulation, wherein the signal is encoded and modulated based upon a plurality of input source symbols; and
   a receiver circuit for receiving and decoding the signal to output the plurality of input source symbols wherein the transmitter circuit comprises:
   a data source for generating the plurality of input source symbols;
   a convolutional encoder for encoding the input source symbols;
   a pseudo-noise (PN) generator for generating a PN code sequence;
   a clock and control circuit for supplying a clock signal to the PN generator;
   a constellation signal selection logic for outputting an in-phase (I) signal and a quadrature-phase (Q) signal based upon mapping of one of the plurality of input source symbols and one of the trellis encoded input source symbols to a constellation signal, and for spreading the I signal and Q signal based on said PN code sequence; and
   an up-converter for receiving the I signal and the Q signal from the constellation signal selection logic and outputting a modulated signal in response to the I signal and the Q signal.

2. The communication system as in claim 1, wherein the signal is convolutionally encoded by the transmitter circuit.

3. The communication system as in claim 1, wherein the signal is encoded using block coding.

4. The communication system as in claim 1, wherein the constellation signal selection logic is implemented as a look-up table, the look-up table storing data associated with the I signal and the Q signal.

5. The communication system as in claim 1, wherein the constellation signal is from a quadrature amplitude modulation (QAM) signal constellation.

6. The communication system as in claim 1, wherein the constellation signal is from a M-ary phase shift keying (MPSK) signal constellation.

7. A spread spectrum communication system comprising:
   a transmitter circuit for generating a signal using trellis-coded modulation, where the signal is encoded and modulated based upon a plurality of input source symbols, and wherein the transmitter circuit comprises:
   a data source for generating the plurality of input source symbols;
   a convolutional encoder for encoding the input source symbols;
   a pseudo-noise (PN) generator for generating a PN code sequence;
   a clock and control circuit for supplying a clock signal to the PN generator;
   a look-up table coupled to the PN generator for outputting an in-phase (I) signal and a quadrature-phase (Q) signal based upon mapping of one of the plurality of input source symbols, one of the encoded input source symbols, and the PN code sequence to a constellation signal, and for spreading the I and Q signals based on said PN code sequence; and
   an up-converter outputting a modulated signal in response to the I signal and the Q signal.

8. The communication system as in claim 7, wherein the constellation signal is from a quadrature amplitude modulation (QAM) signal constellation.

9. The communication system as in claim 7, wherein the constellation signal is from a M-ary phase shift keying (MPSK) signal constellation.

10. The communication system as in claim 1, wherein the receiver circuit comprises:
    a down converter for down converting the modulated signal to recover the I signal and the Q signal;
    a control signal generator for maintaining synchronization with the modulated signal;
    the control signal generator being coupled to the down converter for changing a sampling clock;
    a first despreader for despreading the I signal as a first encoded signal;
    a second despreader for despreading the Q signal as a second encoded signal;
    a pseudo-noise (PN) code generator for generating a PN code sequence and supplying the PN code sequence to the first despreader and second despreader;
    a pseudo-noise (PN) tracking loop for providing a clock signal that is synchronized with the I signal and the Q signal to the PN code generator and the control signal generator; and
    a convolutional decoder for outputting an output data signal in response to the first encoded signal and the second encoded signal, the convolutional decoder being coupled to the control signal generator to maintain synchronization during decoding of the first encoded signal and the second encoded signal.

11. The communication system as in claim 10, wherein the decoder is a Viterbi decoder.

12. The communication system as in claim 1, wherein the receiver circuit comprises:
a frequency synthesizer for generating a carrier frequency;
a down converter for down converting the modulated signal to recover the I signal and the Q signal based upon the carrier frequency;
a pseudo-noise (PN) code generator coupled to the frequency synthesizer, the PN code generator generating a PN code sequence and supplying the PN code sequence to the frequency synthesizer;
a clock and control signal generator for maintaining synchronization with the modulated signal, and supplying the PN code generator with a clock signal;
a pseudo-noise (PN) tracking loop for providing a clock signal that is synchronized with the I signal and the Q signal to the PN code generator and the clock and control signal generator; and
a decoder for outputting an output data signal in response to the first encoded signal and the second encoded signal, the decoder being coupled to the clock and control generator to maintain synchronization during decoding of the first encoded signal and the second encoded signal.

13. The communication system as in claim 12, wherein the decoder is a Viterbi decoder.

14. A method for communication in a spread spectrum system, comprising the steps of:
encoding and modulating a signal based upon a plurality of input source symbols using trellis-coded modulation;
using trellis-coded modulation;
receiving the encoded signal; and
decoding the encoded signal to recover the plurality of input source symbols, said transmitting step comprising:
mapping one of the plurality of input source symbols to a constellation signal;
generating an in-phase (I) signal and a quadrature-phase (Q) signal based upon the mapping step;
generating a PN code sequence;
spreading the I signal and the Q signal based upon the PN code sequence; and
outputting a modulated signal in response to he spread I signal and the spread Q signal, wherein said mapping step and spreading step are executed using constellation signal selection logic.

15. The method as in claim 14, wherein the I signal, the Q signal, and the constellation signal are stored in a look-up table.

16. The method as in claim 14, wherein the constellation signal in the step of generating the I signal and the Q signal is from a quadrature amplitude modulation (QAM) signal constellation.

17. The method as in claim 14, wherein the constellation signal in the step of generating the I signal and the Q signal is from a M-ary phase shift keying (MPSK) signal constellation.

18. The method as in claim 14, wherein the step of transmitting further comprises the steps of:
generating a PN code sequence;
mapping one of the plurality of input source symbols to a constellation signal based upon the PN code sequence;
generating an in-phase (I) signal and a quadrature-phase (Q) signal based upon the mapping step; and
outputting a modulated signal in response to the I signal and the Q signal.

19. The method as in claim 18, wherein the constellation signal in the step of generating the I signal and the Q signal is from a quadrature amplitude modulation (QAM) signal constellation.

20. The method as in claim 18, wherein the constellation signal in the step of generating the I signal and the Q signal is from a M-ary phase shift keying (MPSK) signal constellation.

21. A spread spectrum transmitter comprising:
a data source for generating a binary data stream;
a trellis-coded modulator configured for encoding the binary data stream and correspondingly outputting an encoded signal based upon a selected signal constellation, the trellis-coded modulator mapping the binary data stream to a signal point in the selected signal constellation by set partitioning, wherein mapping of the binary data stream and spreading the encoded signal based upon a pseudo-noise (PN) code sequence are executed using a look-up table.

22. The transmitter as in claim 21, wherein the selected signal constellation is a quadrature amplitude modulation (QAM) signal constellation.

23. The transmitter as in claim 21, wherein the selected signal constellation is a M-ary phase shift keying (MPSK) signal constellation.

24. A spread spectrum receiver comprising:
a despreader for despreading a received encoded signal that has been encoded and modulated using trellis-coded modulation;
a Viterbi decoder for decoding the received encoded signal; and
a memory for storing truncated path metrics associated with the decoding of the received encoded signal.

25. The method of claim 14, wherein the constellation signal selection logic is implemented as a look-up table.

* * * * *